(12) United States Patent
Mueller et al.

(10) Patent No.: US 7,832,548 B2
(45) Date of Patent: Nov. 16, 2010

(54) ADJUSTABLE MAGNETIC IDLE STATION TRANSPORT MECHANISM

(75) Inventors: Rolf A. Mueller, Wooster, OH (US); Douglas Jackson, Rittman, OH (US); Destery L. Pumphrey, Orrville, OH (US)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 46 days.

(21) Appl. No.: 12/008,906

(22) Filed: Jan. 15, 2008

(65) Prior Publication Data

US 2008/0173520 A1 Jul. 24, 2008

Related U.S. Application Data

(60) Provisional application No. 60/881,255, filed on Jan. 19, 2007.

(51) Int. Cl.
*B65G 15/00* (2006.01)
*B65G 17/00* (2006.01)
*B65G 41/00* (2006.01)

(52) U.S. Cl. ............... 198/690.1; 198/836.3; 198/861.1

(58) Field of Classification Search .............. 198/690.1, 198/836.3, 861.1
See application file for complete search history.

(56) References Cited

U.S. PATENT DOCUMENTS

| 4,259,052 | A | 3/1981 | Imanishi et al. |
| 4,790,426 | A | 12/1988 | Kabushiki |
| 5,383,320 | A * | 1/1995 | Sorton ........................ 52/749.1 |
| 5,584,205 | A * | 12/1996 | Harsch et al. ............ 72/405.02 |
| 6,322,314 | B1 | 11/2001 | Sofy |
| 6,398,016 | B1 * | 6/2002 | Maeder et al. .......... 198/867.13 |
| 6,672,448 | B2 | 1/2004 | Arai et al. |
| 7,204,192 | B2 * | 4/2007 | Lamb et al. .................. 104/282 |

FOREIGN PATENT DOCUMENTS

| JP | 55 022433 A |   | 2/1980 |
| JP | 55022433 A | * | 2/1980 |
| JP | 09 010868 A1 |   | 1/1997 |
| JP | 09010868 A | * | 1/1997 |

* cited by examiner

*Primary Examiner*—Gene Crawford
*Assistant Examiner*—Yolanda Cumbess
(74) *Attorney, Agent, or Firm*—Simpson & Simpson, PLLC

(57) ABSTRACT

An idle station transport mechanism for a press, including a first plurality of magnetizable transport rails; a second plurality of magnetizable transport rails axially displaceable with respect to the first plurality of transport rails; and a plurality of transfer bars magnetizable to engage the material. The first and second pluralities of rails form a transport path along which material to be manipulated by the press is arranged to be transported and the transfer bars are displaceable to move the material axially along the transport path. In some aspects, the second plurality of transport rails is automatically displaceable while in the press, the plurality of transfer bars is arranged to magnetically engage a bottom side of the material, or the first and second pluralities of transport rails and the plurality of transfer bars are electro-magnetic. Also, a method of transporting material to a press.

10 Claims, 7 Drawing Sheets

ADJUSTABLE MAGNETIC IDLE STATION TRANSPORT MECHANISM

CROSS-REFERENCE TO RELATED APPLICATIONS

This application claims the benefit under 35 U.S.C. §119 (e) of U.S. Provisional Application No. 60/881,255 filed on Jan. 19, 2007 which application is incorporated herein by reference.

FIELD OF THE INVENTION

The present invention relates to the transportation of materials to a press. In particular the present invention relates to a mechanism and method to transport various sized blanks from a blanking station to a forming station in a press using fixed and displaceable magnetic rails and bars. Further, the mechanism and method include automatic adjustment to accommodate various sizes of blanks.

BACKGROUND OF THE INVENTION

Transport mechanisms for blanks are known in the art. Unfortunately, the known mechanisms do not facilitate easy adjustment to accommodate blanks of various sizes.

Thus, there is a long-felt need for a mechanism and means for transporting blanks that can be quickly and easily adapted to various sized blanks.

BRIEF SUMMARY OF THE INVENTION

The present invention broadly comprises an idle station transport mechanism for a press including a first plurality of magnetizable transport rails; a second plurality of magnetizable transport rails axially displaceable with respect to the first plurality of transport rails; and a plurality of transfer bars magnetizable to engage the material. The first and second pluralities of rails form a transport path along which material to be manipulated by the press is arranged to be transported and the transfer bars are displaceable to move the material axially along the transport path. In some aspects, the second plurality of transport rails is automatically displaceable while in the press. In some aspects, the mechanism includes a memory element and the second plurality of transport rails is automatically displaceable in response to data in the memory element. In some aspects, the first and second pluralities of transport rails and the plurality of transfer bars are electromagnetic.

In some aspects, the first and second pluralities of transport rails include respective top surfaces and the respective top surfaces form the transport path. In some aspects, the second plurality of transport rails is displaceable to axially overlap the first plurality of rails. In some aspects, the first and second pluralities of transport rails form a composite axial length and the second plurality of transport rails is displaceable to vary the composite axial length. In some aspects, the transfer bars are arranged to magnetically engage a bottom side of the material. In some aspects, the first and second pluralities of transport rails and the plurality of transfer bars are arranged to be alternatingly magnetized.

In some aspects, the first and second pluralities of transport rails include a first outside edge and a second outside edge and the second outside edge is on an opposite side of a longitudinal axis for the mechanism. Then, the plurality of transfer bars includes at least one first and second transfer bar disposed outside of the first and second outside edges, respectively, with respect to the axis. In some aspects, the first plurality of transport rails is fixed and includes a first rail and a first pair of rails and the second plurality of transport rails includes a second rail and a second pair of rails and wherein the second rail is displaceable between the first pair of rails and the second pair of rails is displaceable about the first rail.

The present invention also broadly comprises an idle station transport mechanism for a press, including a first plurality of electro-magnetic transport rails and a second plurality of electro-magnetic transport rails axially displaceable with respect to the first plurality of transport rails while the second plurality of transport rails is disposed in the press. The first and second pluralities of rails form a transport path along which material to be manipulated by the press is arranged to be transported. In some aspects, the second plurality of transport rails is automatically displaceable.

In some aspects, the mechanism includes a plurality of electro-magnetic transfer bars arranged to magnetically engage a bottom side of the material and the transfer bars are displaceable to move the material axially along the transport path. In some aspects, the first and second pluralities of transport rails and the plurality of transfer bars are arranged to be alternatingly magnetized.

The present invention further broadly comprises a method of transporting material to a press, including the steps of axially displacing a first plurality of transport rails with respect to a second plurality of transport rails; magnetically engaging a bottom side of a piece of material with a plurality of transfer bars; axially displacing the transfer bars; depositing the piece of material on a portion of the first and second pluralities of transport rails; and magnetically engaging the piece of material with the portion. In some aspects, the method disengages the piece of material and the plurality of transfer bars when magnetically engaging the piece of material with the portion.

In some aspects, axially displacing a first plurality of transport rails includes automatically displacing the first plurality of transport rails while the first plurality of transport rails is in the press or axially overlapping the first and second pluralities of rails. In some aspects, the first and second pluralities of transport rails form a composite axial length and axially displacing a first plurality of transport rails with respect to a second plurality of transport rails includes varying the composite axial length. In some aspects, the method alternatingly magnetizes the first and second pluralities of transport rails and the plurality of transfer bars.

In some aspects, the first plurality of transport rails is fixed and includes a first rail and a first pair of rails, the second plurality of transport rails includes a second rail and a second pair of rails, and axially displacing a first plurality of transport rails includes displacing the second rail between the first pair of rails and displacing the second pair of rails about the first rail. In some aspects, the method repeats the steps of magnetically engaging a piece of material with a plurality of transfer bars; axially displacing the transfer bars; depositing the piece of material on a portion of the first and second pluralities of transport rails; magnetically engaging the piece of material with the portion; and disengaging the piece of material and the plurality of transfer bars when magnetically engaging the piece of material with the portion.

It is a general object of the present invention to provide a device for transporting blanks of various sizes to a stamping press, which is automatically adjustable to accommodate blanks of various sizes.

It is a further general object of the present invention to provide a method for transporting blanks to a stamping press that automatically adapts to blanks of various sizes.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
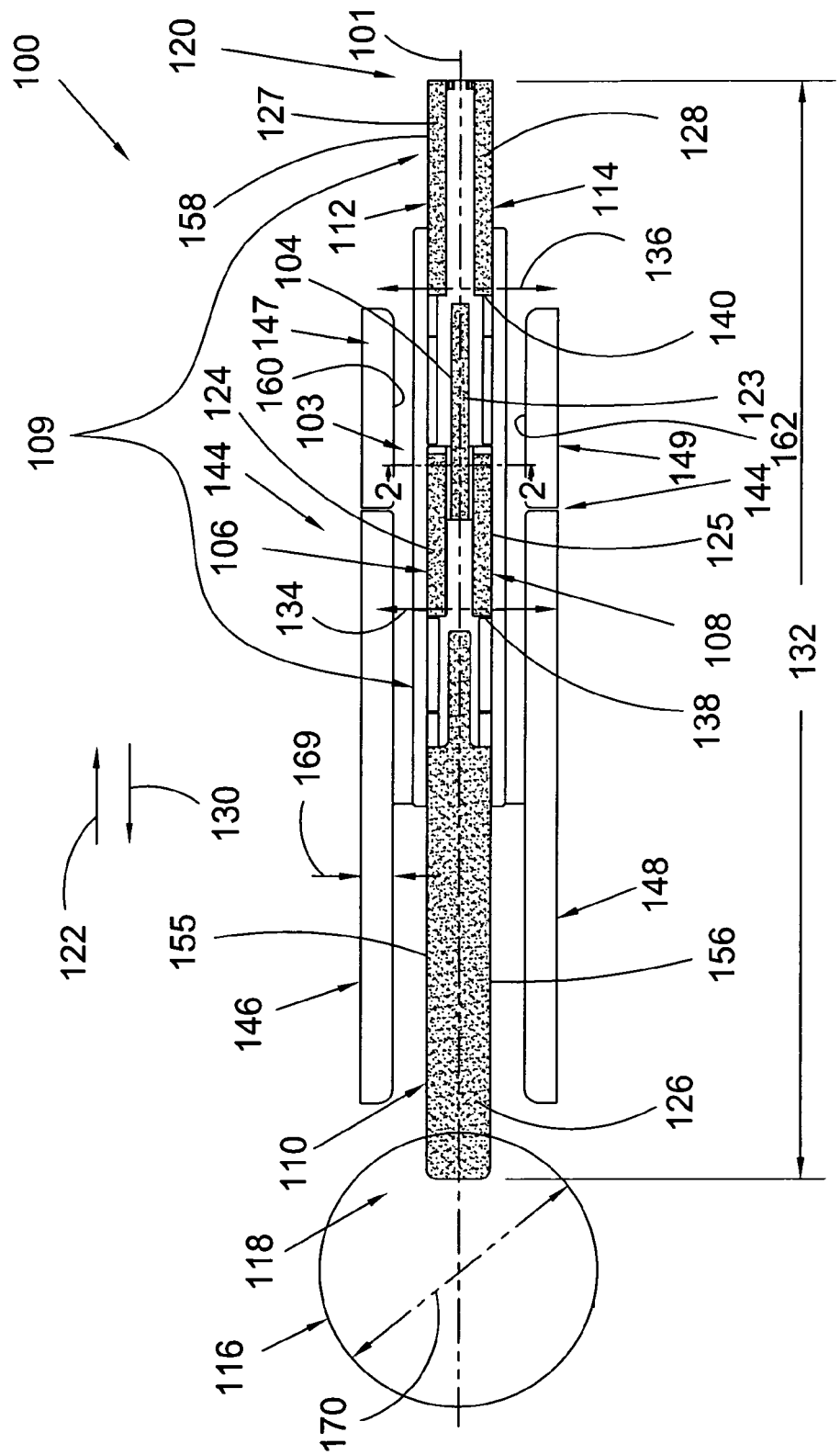
FIG. 1 is a top view of a present invention idle station transport mechanism in a non-overlapping position.

FIG. 1 is a top view of present invention idle station transport mechanism 100 in a non-overlapping position. The following briefly describes spatial terminology used in the discussions that follow. Longitudinal, or axial, refers to a plane, line, or direction that is parallel to a longitudinal axis for mechanism 100, for example, axis 101. Transverse refers to a plane, line, or direction orthogonal to the axis. Horizontally transverse refers to a plane, line, or direction that is also horizontal. For example, a horizontal transverse line can define a width. Vertically transverse refers to a plane, line, or direction that also is vertical. For example, a vertical transverse line can define a height.

Mechanism 100 is located in or as part of press 102, however, to simplify the presentation and highlight the claimed invention, only some portions of the press are shown in FIG. 1. Mechanism 100 includes a plurality 103 of magnetizable transport rails. In some aspects, plurality 103 includes rails 104, 106, and 108. Mechanism 100 also includes plurality 109 of magnetizable transport rails. In some aspects, plurality 109 includes rails 110, 112, and 114. By magnetizable, we mean that the rails, or parts of the rails, can be acted upon to generate a magnetic field about the rails. The rails can be any type of magnetizable rail known in the art, for example, including, but not limited to electro-magnetic rails. That is, rails producing a magnetic field when energized with electric power. The entire rail can act as a magnet, or portions of the rail can act as a magnet. For example, individual electro-magnets can be disposed in a rail. Hereinafter, unless stated otherwise, rail is used to mean the structure of the rail and any magnetic components that may be associated with the rail, for example, individual magnets. Although pluralities 103 and 109 are shown with a specific number and configuration of transport rails, it should be understood that a present invention mechanism is not limited to the number and configuration of rails shown and that other numbers and configurations of rails are within the spirit and scope of the claimed invention. It should be understood that a present invention mechanism is not limited to use with any particular type of press and that press 102 can be any press known in the art.

Plurality 109 is axially displaceable with respect to plurality 103, as further described infra. By axially displaceable, we mean displaceable parallel to axis 101. In some aspects, as further described infra, the transport rails in plurality 109 are automatically displaceable, or adjustable, while the transport rails are in the press. That is, the adjustment is made without removing the rails from the press. By automatically displaceable, we mean that the rails are displaced by a device or devices (not shown) in response to a control input, for example, provided by an operator (not shown) of mechanism 100. That is, the rails are not displaced or adjusted manually. For example, the transport rails are connected to motors or other displacement means, and the motors or displacement means are automatically controlled, in response to the control input, to adjust the transport bars. Pluralities 103 and 109 form a transport path along which magnetic material 116, to be manipulated by the press, is arranged to be transported. In particular, the path is disposed between ends 118 and 120 of the mechanism and is parallel to axis 101, and the material is arranged to be moved from end 118 in direction 122. Further, as described infra, pluralities 103 and 109 are magnetizable to fix material 116 with respect to the path. That is, at times during the transport of the material along the path, the pluralities of transport rails are magnetized to hold the material in place against the pluralities of transport rails. Alternately stated, the pluralities are arranged to magnetically engage the material. By magnetically engage, we mean fix the material to the transport rails using magnet force generated by the transport rails.

Figure 2:
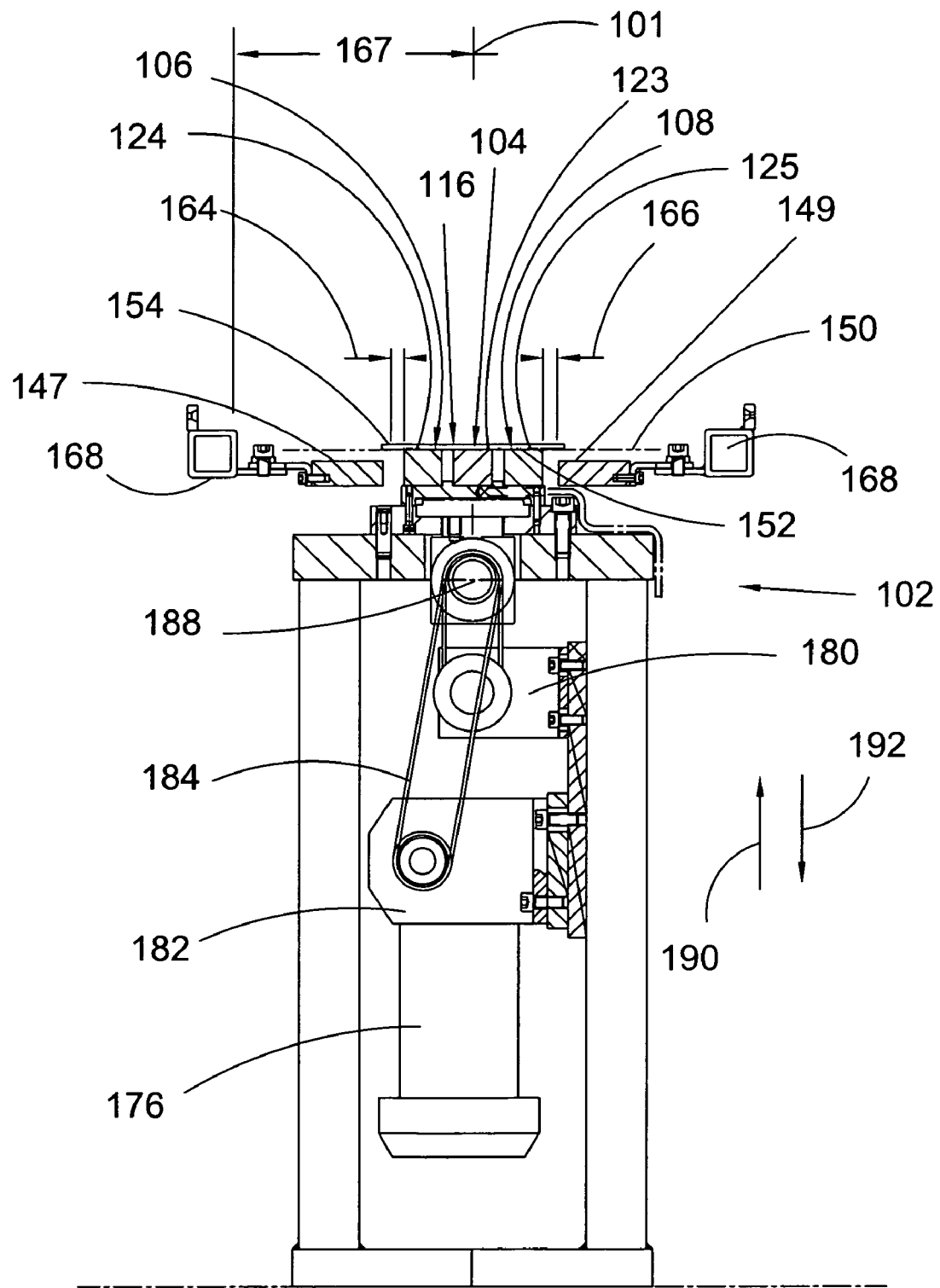
FIG. 2 is a cross-sectional view of the present invention idle station transport mechanism in FIG. 1 generally along line 2-2 in FIG. 1.

FIG. 2 is a cross-sectional view of present invention idle station transport mechanism 100 in FIG. 1 generally along line 2-2 in FIG. 1. The following should be viewed in light of FIGS. 1 and 2. Rails 104, 106, 108, 110, 112, and 114 include top surfaces 123-128, respectively, which form the travel path. By top surface we mean surfaces facing upward in a gravitation context. For example, if mechanism 100 is disposed on a level surface, the top surfaces face away from the level surface.

Figure 3:
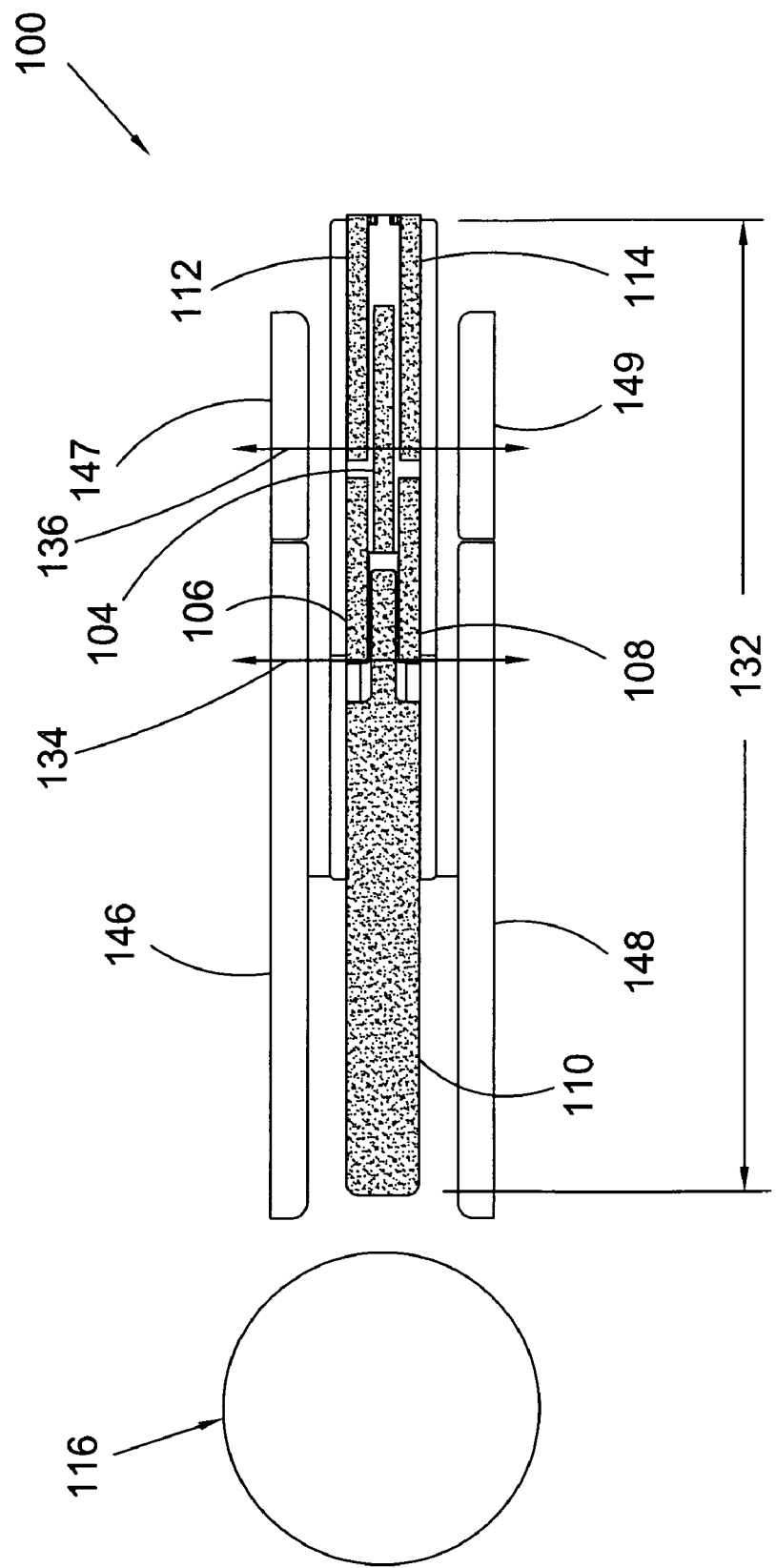
FIG. 3 is a top view of the present invention idle station transport mechanism in FIG. 1 in an overlapping position.

FIG. 3 is a top view of present invention idle station transport mechanism 100 in FIG. 1 in an overlapping position. The following should be viewed in light of FIGS. 1 through 3. Rails 110, 112, and 114 are displaceable in directions 122 and 130 to modify, or change, composite axial length 132 of pluralities 103 and 109. By composite axial length, we mean the total combined axial length of a particular configuration of pluralities 103 and 109. By displacing plurality 109 in directions 122 and 130, length 132 is modified. In some aspects, shown infra, plurality 109 axially overlaps plurality 103. By axially overlap, we mean that the pluralities overlap in an axial direction. Alternately stated, the overlap is with respect to a line orthogonal to axis 101, for example, lines 134 or 136. For example, in FIG. 1, rail 110 is displaced in direction 130 and rails 112 and 114 are displaced in direction 122 so that the pluralities are not overlapping along lines 134 or 136. In contrast, in FIG. 3, rail 110 is displaced in direction 122 and rails 112 and 114 are displaced in direction 130 so that the pluralities are overlapping along lines 134 and 136. In FIGS. 1 and 3, lines 134 and 136 are disposed proximate ends 138 and 140, respectively, and thus are associated with an initial overlap of the pluralities as rail 110 and rails 112 and 114 are moved in directions 122 and 130, respectively.

Mechanism 100 also includes plurality 144 of transfer bars. In some aspects, plurality 144 includes bars 146 through 149. The transfer bars are magnetizable to engage material 116 and as further described infra, are displaceable to move the material axially along the transport path, that is, from end 118 to end 120. The transfer bars can be any type of magnetizable bar known in the art, for example, including, but not limited to electro-magnetic bars. The discussion regarding magnetization and the transport rails is applicable to the transfer bars. In some aspects, bars 146 through 149 are disposed below surfaces 123-128 when in an unengaged position. For example, as shown in FIG. 2, the bars are below top surface line 150 for the rails. In some aspects, the transfer bars are arranged to magnetically engage bottom side 152 of material 116. In some aspects (not shown), plurality 144 is disposed above line 150 in an unengaged position and is arranged to magnetically engage top side 154 of material 116.

The rails in pluralities 103 and 109 include respective outside edges with respect to axis 101. For example, edges 155 and 156 of rail 110 are outside edges for the rail and edge 158 of rail 112 is an outside edge for the rail. In some aspects, respective outside edges for more than one rail in pluralities 103 and 109 are a same distance from axis 101. For example, edges 155 and 156 are collinear with the respective outside edges for rails 106 and 112 and 108 and 114, respectively. In some aspects (not shown), outside edges for only a single rail in the pluralities are at a furthest distance from the axis. The transfer bars are disposed beyond the outside edges for the transport rails so that the rails do not interfere with the operation of the transfer bars. For example, bars 146 through 149 are at a further orthogonal distance from axis 101 than edges 155 and 156, respectively. Inner edges 160 and 162 of transfer bars 147 and 149, respectively, are distances 164 and 166, respectively, from edges 155 and 156 respectively. In some aspects, distances 164 and 166 are equal. In some aspects (not shown), distances 164 and 166 are different one from the other.

Distance 167 between transfer mechanism 168 and axis 101 is fixed and the transfer bars are fixedly connected to mechanism 168 by any means known in the art. In general, width 169 of the transfer bars is selected so that the transfer bars are in vertical transverse alignment with at least a portion of material 116. For example, width 169 is selected so that when the transfer bars are connected to mechanism 168, the bars extend sufficiently toward the axis to engage material 116 when the bars are displaced in a vertically transverse direction as further described infra. Mechanism 168 is used to translate the transfer bars transversely and axially as further described infra and can be any translation mechanism known in the art.

To implement the transport of material 116 to end 120, pluralities 103 and 109 are arranged to be alternatingly magnetized with plurality 144, as further described infra. In general, the rails in pluralities 103 and 109 are magnetized or demagnetized as a group and the transfer bars are magnetized and demagnetized as a group. For example, for a period of time the transport rails are magnetized to hold the material against the transport rails. During this same period, the transfer bars are demagnetized so as to not magnetically attract or engage the material, and the bars are held in the unengaged position. Then in a subsequent period of time, the transfer bars move toward the material and are magnetized to engage the material, and the transport rails are demagnetized so as to not magnetically engage material 116. Then, the transfer bars lift the material, translate axially to move the material in direction 122, and lower the material toward the transport rails. As the material contacts, or nearly contacts, the transport rails, the transport rails are magnetized and the transfer bars are demagnetized so that the material is magnetically fixed to the transport rails.

The structure and function of mechanism 100 is now described in further detail. Rails 104, 106, 108, 110, 112, and 114 are generally rectangular. The widths and lengths of the rails can be selected according to availability of the rails, the respective dimensions of mechanism 100 and press 102, and the dimensions of the material to be handled by mechanism 100. Rails 110, 112, and 114 are arranged to axially displace, or slide, to vary length 132 to accommodate the dimensions of material 116 and the dimensions of a press station (not shown) to which material 116 is being transported. In some aspects, material 116 is a circular blank with diameter 170, the press station includes forming dies (not shown) having a width, and length 132 is adjusted to accommodate the diameter and the die width. In the discussion that follows, material 116 is assumed to be a circular blank and the press is assumed to include a forming die, however, it should be understood that a present invention mechanism is not limited to transporting circular blanks and that other shapes of materials can be transported by a present invention mechanism.

Length 132 of axial travel is determined by the axial displacement, or stroke length, associated with each stroke of the press station. The stroke length is a function of the die diameter, which is a function of diameter 170. That is, each stroke length is long enough to pass a blank through the die. As diameter 170, and subsequently, the die width, increase, the stroke length increases, and length 132 is decreased. That is, larger diameter blanks use a shorter transport path to clear the blank and the die. Conversely, as the diameter, and subsequently, the die width, decrease, the stroke length decreases and length 132 is increased. That is, each stroke results in less axial translation. To accommodate a larger diameter blank, rail 110 is moved in direction 122 and rails 112 and 114 are moved in direction 130. For example, FIG. 3 shows mechanism 100 configured to handle a larger diameter blank. To accommodate a smaller diameter blank, rail 110 is moved in direction 130 and rails 112 and 114 are moved in direction 122. For example, FIG. 1 shows mechanism 100 configured to handle a smaller diameter blank. Thus, rails 110, 112, and 114 are axially extended to provide the necessary length 132.

Figure 4:
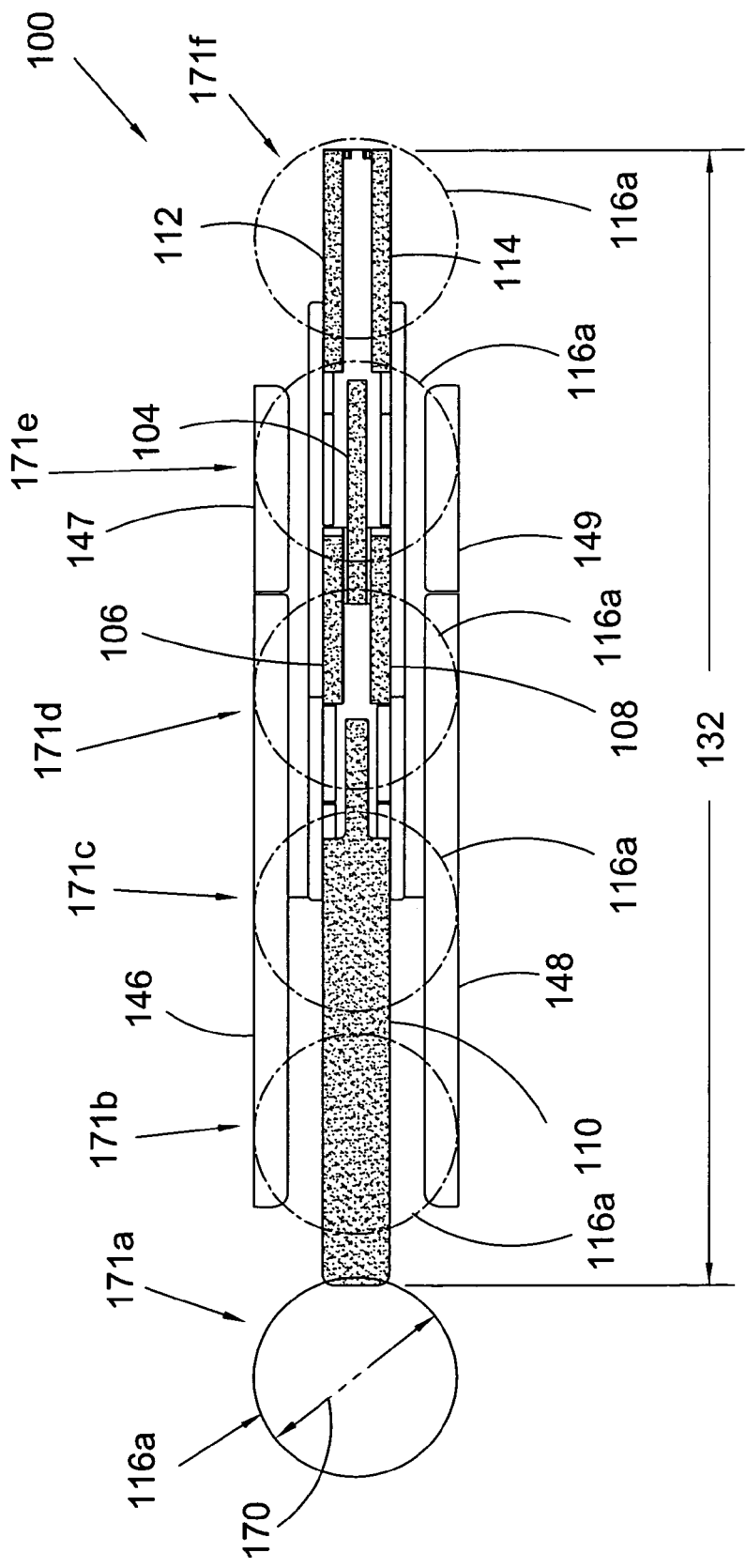
FIG. 4 is a top view of the present invention idle station transport mechanism in FIG. 1 showing a transport sequence for a smaller diameter blank.

FIG. 4 is a top view of present invention idle station transport mechanism 100 in FIG. 1 showing a transport sequence for a smaller diameter blank. The following should be viewed in light of FIGS. 1 through 4. As described infra, equipment other than mechanism 100 transports a blank from an initial position, for example, position 171a, to the first position from which mechanism 100 operates on the blank, for example, position 171b. In FIG. 4, four stroke lengths are needed to axially displace blank 116a through mechanism 100. For example, from position 171b, blank 116a moves though position 171c to position 171f, where each of positions 171b through 171f is separated by a stroke length.

Figure 5:
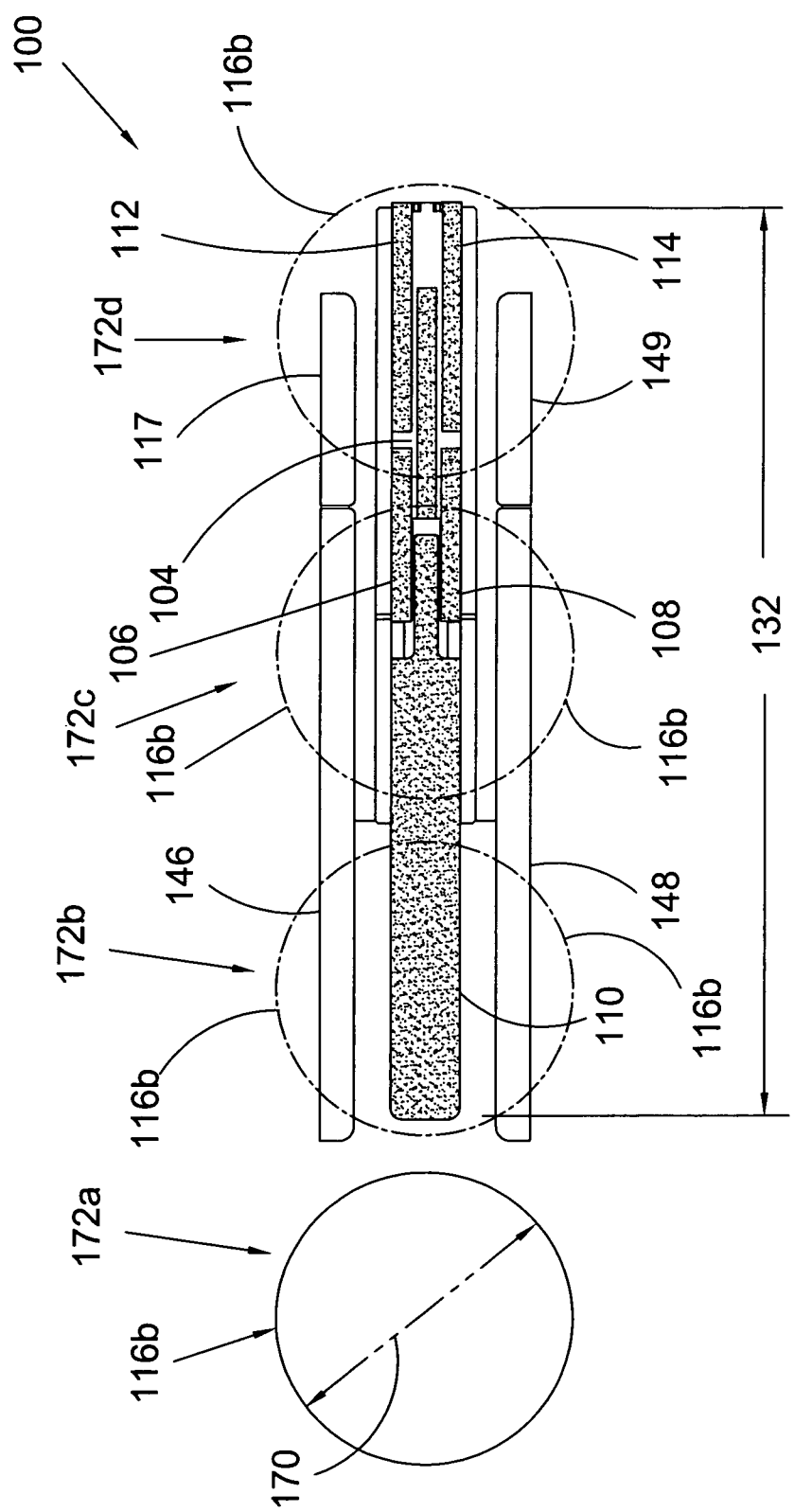
FIG. 5 is a top view of the present invention idle station transport mechanism in FIG. 3 showing a transport sequence for a larger diameter blank.

FIG. 5 is a top view of present invention idle station transport mechanism 100 in FIG. 3 showing a transport sequence for a larger diameter blank. The following should be viewed in light of FIGS. 1 through 5. Blank 116b has a larger diameter 170 than blank 116a, and subsequently, only two stroke lengths are needed to traverse mechanism 100. For example, from position 172b, blank 116b moves though position 172c to position 172d, where each of positions 172b through 172d is separated by a stroke length.

Figure 6:
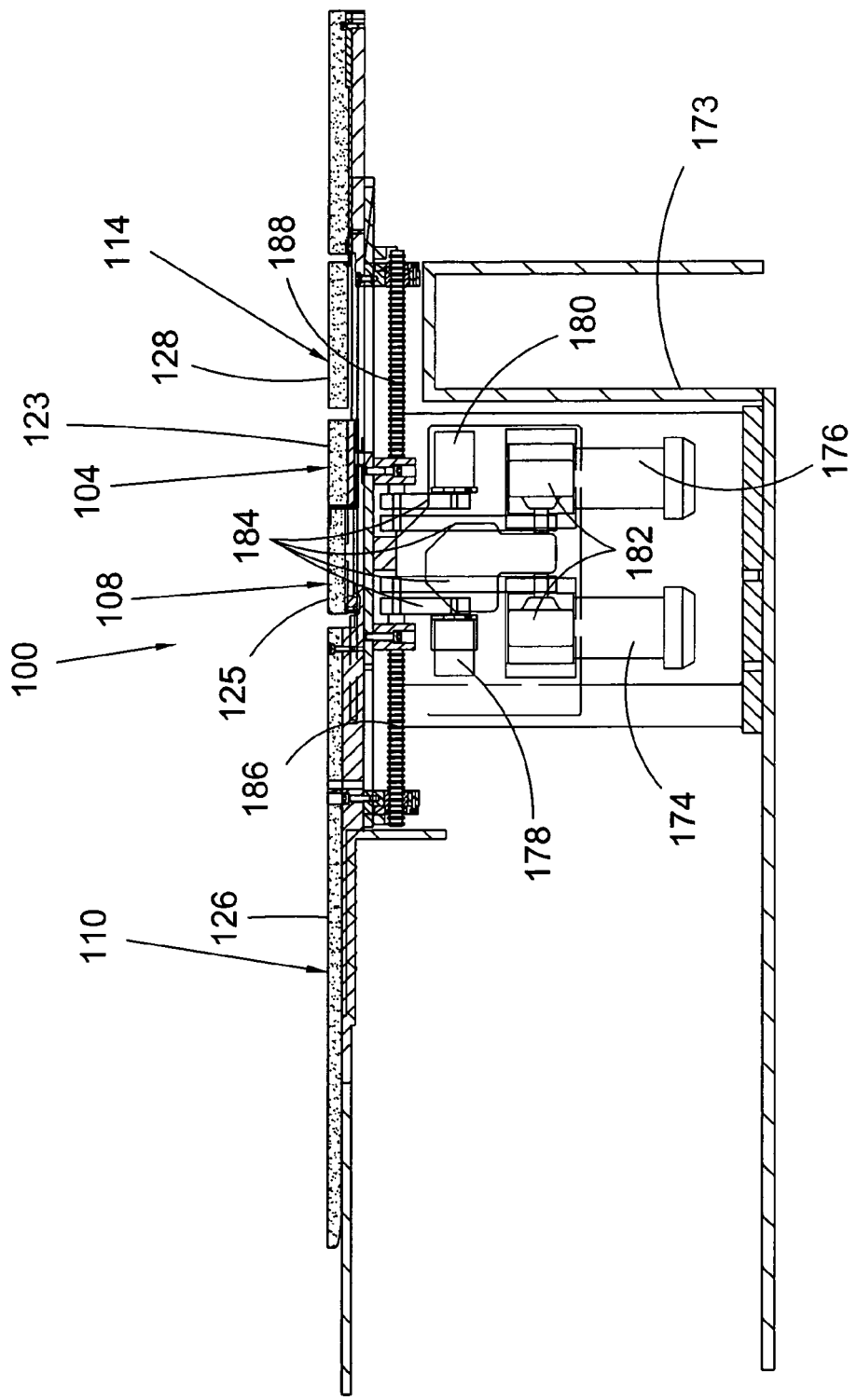
FIG. 6 is a front view of the present invention idle station transport mechanism in FIG. 1 with the front side of the housing removed; and, FIG. 7 is a flow chart illustrating a present invention method of transporting material to a press.

FIG. 6 is a front view of present invention idle station transport mechanism 100 in FIG. 1 with the front side of housing 173 removed. Rails 110, 112, and 114 can be axially displaced by any means known in the art, including but not limited to electric motors, hydraulic means, and pneumatic means. In some aspects, motors 174 and 176 are used with rotary encoders 178 and 180 to displace the rails in plurality 109. Right-angle gearboxes 182 provide output torque from motors 174 and 176 to belts 184, which transmit the torque to encoders 178 and 180, and ball screws 186 and 188, respectively. Ball screw 186 controls the axial displacement of rail 110 and ball screw 188 controls the axial displacement of rails 112 and 114. The axial positions of rail 110 and rails 112 and 114 are based on feedback from the respective encoders. In some aspects, the respective axial locations of rail 110 and rails 112 and 114 with respect to various sizes of material 116, for example, with respect to various diameters 170 for blanks, are stored in a computer-based memory (not shown), for example, in a controller. Then, information regarding the blank to be transported, for example, the specific diameter 170, is inputted to the control system and motors 174 and 176 automatically move the rails to the desired respective positions stored in the memory. Thus, advantageously, mechanism 100 can be quickly and automatically modified to accommodate various sizes of materials or blanks without removing the mechanism from the press and without lengthy or complicated operations. It should be understood that any displacement, torque transmission, feedback, memory, or control components known in the art can be used with a present invention mechanism. Further, it should be understood that a present invention mechanism is not limited to the type, number, or configuration of parts shown in FIG. 6 and that other types, numbers, or configurations of parts are included within the spirit and scope of the claims.

The following further describes a sequence for moving blanks in mechanism 100. In some aspects, plurality 144 includes two or more bars on each side of axis 101 as shown in the figures and the two or more bars are displaced as a unit. The sequence for moving blank 116b in FIG. 5 from position 172a to 172d is used as an example. Blank 116b is formed and placed in position 172a by any means known in the art, for example, by a blanking press. In position 172b, rail 110 is magnetized to engage the blank. In the unengaged, or at rest position, the transfer bars are located below line 150, for example, as shown in FIG. 2 and are not yet magnetized. To initiate the transfer of the blank from position 172b, the transfer bars are displaced in direction 190 until bars 146 and 148 encounter, or nearly encounter, the blank. At this point, rail 110 is demagnetized and the bars are magnetized. This switch in magnetization can be performed simultaneously or with an overlap.

The transfer bars, in particular bars 146 and 148, continue to translate in direction 190 to lift the blank from rail 110. Then the bars translate axially in direction 122 and transversely in direction 192 to lower the blank to position 172c. At this point, rail 110 is magnetized and the bars are demagnetized. This switch in magnetization can be performed simultaneously or with an overlap. The bars then translate in direction 130 to return to the rest position. In like manner, the blank is moved to position 172d. At position 172d, a transfer mechanism (not shown) from press 102 engages and moves the blank. The process described supra is applied to any number of blanks in mechanism 100. For example, if at the beginning of the cycle described supra, respective blanks are located at positions 172b and 172c, the blanks in positions 172b or 172c are each displaced one position in direction 122, by bars 146 and 148 and bars 147 and 149, respectively. For example, a blank in position 172b is transferred to position 172c. The above description of the sequence for moving blank 116b in FIG. 5 is applicable to any size of blank, for example, the above description is applicable to FIG. 4.

Figure 7:
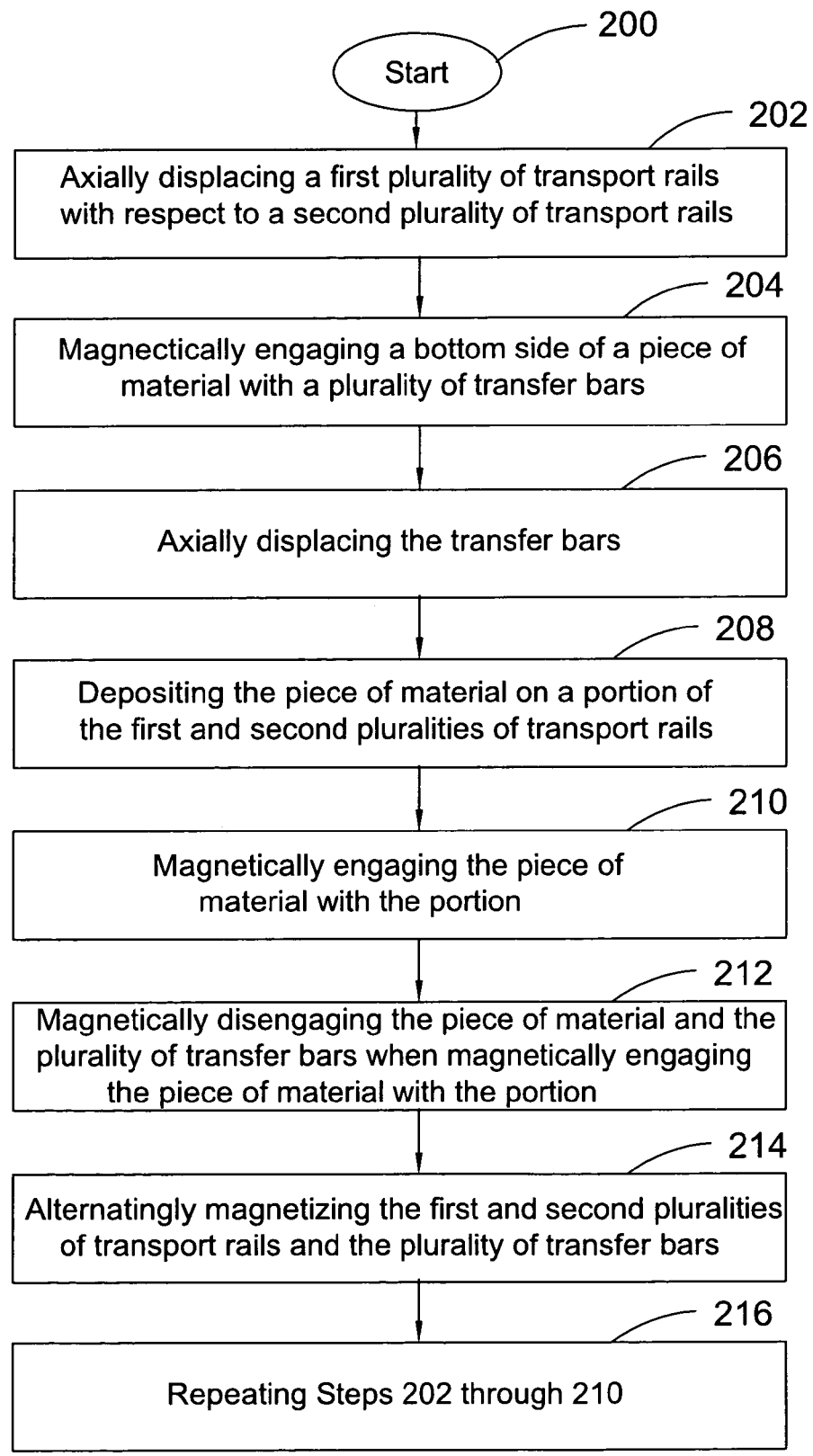

FIG. 7 is a flow chart illustrating a present invention method of transporting material to a press. Although the method in FIG. 7 is depicted as a sequence of numbered steps for clarity, no order should be inferred from the numbering unless explicitly stated. The method starts at Step 200. Step 202 axially displaces a first plurality of transport rails with respect to a second plurality of transport rails. Step 204 magnetically engages a bottom side of a piece of material with a plurality of transfer bars. Step 206 axially displaces the transfer bars. Step 208 deposits the piece of material on a portion of the first and second pluralities of transport rails. Step 210 magnetically engages the piece of material with the portion. In some aspects, step 212 magnetically disengages the piece of material and the plurality of transfer bars when magnetically engaging the piece of material with the portion. In some aspects, step 214 alternatingly magnetizes the first and second pluralities of transport rails and the plurality of transfer bars.

In some aspects, step 202 automatically displaces the first plurality of transport rails while the first plurality of transport rails is in the press, or axially overlaps the first and second pluralities of rails. In some aspects, the first and second pluralities of transport rails form a composite axial length and step 202 varies the composite axial length. In some aspects, step 216 repeats steps 202 through 210.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. An idle station transport mechanism for a press, comprising:
   a first plurality of magnetizable transport rails;
   a second plurality of magnetizable transport rails axially displaceable with respect to said first plurality of transport rails; and,
   a plurality of transfer bars magnetizable to engage said material, wherein said first and second pluralities of rails form a transport path along which material to be manipulated by said press is arranged to be transported, wherein said transfer bars are displaceable to move said material axially along said transport path, and wherein said first and second pluralities of transport rails form a composite axial length and said second plurality of transport rails is displaceable to vary said composite axial length, wherein said first and second pluralities of transport rails further comprise a first outside edge and a second outside edge, respectively, said first and second outside edges on opposite sides of a longitudinal axis for said mechanism and wherein said plurality of transfer bars comprises at least one first and second transfer bar disposed outside of said first and second outside edges, respectively, with respect to said axis.

2. The mechanism recited in claim 1 wherein said second plurality of transport rails is displaceable while in said press.

3. The mechanism recited in claim 1 wherein said second plurality of transport rails is automatically displaceable.

4. The mechanism recited in claim 3 wherein said mechanism further comprises a memory element and said second plurality of transport rails is automatically displaceable in response to data in said memory element.

5. The mechanism recited in claim 1 wherein said first and second pluralities of transport rails further comprise respective top surfaces and said respective top surfaces form said transport path.

6. The mechanism recited in claim 1 wherein said second plurality of transport rails is displaceable to axially overlap said first plurality of rails.

7. The mechanism recited in claim 1 wherein said transfer bars are arranged to magnetically engage a bottom side of said material.

8. The mechanism recited in claim 1 wherein said first and second pluralities of transport rails and said plurality of transfer bars are arranged to be alternatingly magnetized.

9. The mechanism recited in claim 1 wherein said first plurality of transport rails is fixed and comprises a first rail and a first pair of rails and said second plurality of transport rails comprises a second rail and a second pair of rails and wherein said second rail is displaceable between said first pair of rails and said second pair of rails is displaceable about said first rail.

10. The mechanism recited in claim 1 wherein said first and second pluralities of transport rails and said plurality of transfer bars are electro-magnetic.

* * * * *